United States Patent [19]

Palumbo et al.

[11] Patent Number: 5,323,297
[45] Date of Patent: Jun. 21, 1994

[54] TWIST-IN MOUNTING FOR ELECTROMECHANICAL COMPONENT

[76] Inventors: Nicholas R. Palumbo, 28 Redwood Dr., Cumberland, R.I. 02864; Edward B. Mitchell, 384 School St., Belmont, Mass. 02178

[21] Appl. No.: 965,894

[22] Filed: Oct. 23, 1992

Related U.S. Application Data

[63] Continuation-in-part of Ser. No. 762,586, Sep. 19, 1991, Pat. No. 5,225,970.

[51] Int. Cl.$^5$ .............................................. H05K 7/02
[52] U.S. Cl. .................................... 361/809; 248/27.1
[58] Field of Search ............. 24/590; 248/27.1, 221.3, 248/231.9; 292/352, 354, 355; 361/807, 809, 760, 759, 769, 787, 790; 403/348

[56] References Cited

U.S. PATENT DOCUMENTS 3,364,396  1/1968  Stephan .............................. 361/809

Primary Examiner—Leo P. Picard
Assistant Examiner—Donald Sparks

[57] ABSTRACT

Twist-in mounting structure comprises a barrel, and panel capture tabs extending oppositely away therefrom, each terminating in a free end spaced away from the barrel. Each tab has an interference surface sloping downwardly and inwardly toward the barrel, and an interference region bounded by the interference surface. An acute angle is included between the interference surfaces and a cooperative raised capture plateau lying below them. A spring locking arm, sprung out of the plane of the housing mounting surface, provides a distal locking element. The housing mounting surface provides structure for laterally capturing the locking arm. The locking arm responds to a varying force to move between an unstressed position, a depressed position in which the locking element is depressed within the housing mounting surface structure, and a locking position in which the locking element extends through a panel aperture to fix the component rotationally with respect to a panel captured between the panel capture tabs and the panel capture plateau.

5 Claims, 4 Drawing Sheets

TWIST-IN MOUNTING FOR ELECTROMECHANICAL COMPONENT

This is a continuation-in-part of U.S. Ser. No. 07/762,586, now U.S. Pat. No. 5,225,970 filed Sep. 19, 1991.

This invention relates to an improved panel-mounting electromechanical component, in particular a component having external mounting structure providing twist-in mounting to a single aperture in a panel.

Electromechanical components, such as switches, relays, electrically operated buzzers, and the like, are assembled to panels in various ways. Assembly by means of screws is relatively expensive and inconvenient, requiring the supply of appropriate screws and the use of a tool. To avoid the need for screws and tools, various types of push-in or twist-in mounting components have been designed for mounting to apertures provided in the panel for the purpose.

Some existing push-in or twist-in mountings have been subject to being accidently dislodged under axial forces exerted on the mounted component, or to "dishing" of the panel under such forces during assembly or use, causing interference between component actuating knob and panel. Some such mountings have permitted axial travel or slack of the mounted component with respect to the panel, giving a very unsatisfactory loose feel to the component in use.

It is therefore an object of the present invention to provide a twist-in component mounting which obviates the need for screws or assembling tools, which is adaptable to use on components of various sizes while mounting to a panel aperture of a standard size and shape, which is resistant to being dislodged during use of the component, which reduces dishing of the panel, and which firmly retains the component to the panel without slack. Additionally, it is an object to provide such a mounting which ensures an accurate angular relationship between the component and the panel on which it is mounted, ensuring accurate registration with panel graphics or other panel features.

It is also an object of the invention to provide a twist-in mounting which is particularly adapted for use on relatively small electromechanical components.

It is a further object of the invention to provide such a twist-in mounting which permits the component to be easily removed from the panel from either the front or back of the panel.

SUMMARY OF THE INVENTION

According to the invention, for assembly to an apertured panel, an electromechanical component has a housing having a mounting surface which when the component is assembled to a panel is adjacent a first panel surface. The component housing provides twist-in mounting structure comprising a barrel extending outwardly of the housing mounting surface, and panel capture tabs integrally formed with the housing and extending oppositely away from the axis of the barrel, each panel capture tab terminating in a free end spaced away from the barrel. Each panel capture tab has a panel interference surface sloping from the capture tab free end downwardly toward the housing mounting surface and inwardly toward the barrel, and an interference region bounded by the interference surface.

The twist-in mounting structure further comprises a cooperative raised panel capture plateau below the panel capture tab interference surfaces; a panel capture tab interference surface and the panel capture plateau include an acute angle between them. A spring locking arm extends away from the mounting structure barrel and is sprung out of the plane of the housing mounting surface, and provides a distal locking element. The housing mounting surface provides receiving structure for laterally capturing the spring locking arm. The spring element responds to a varying force to move between an unstressed position in which the spring locking arm is unstressed, a depressed position in which the distal locking element is depressed within the housing mounting surface receiving structure, and a locking position in which the spring arm distal locking element extends through a panel aperture to fix the component rotationally with respect to a panel captured between the panel capture tabs and the panel capture plateau.

In preferred embodiments, the housing is made of polymeric material and has a mounting surface which when the component is assembled to a panel is adjacent a first panel surface. The twist-in mounting structure comprises portions integrally molded with the component housing, and a spring element.

The integrally molded structure portions comprise a barrel extending outwardly of the housing mounting surface, and panel capture tabs symmetric about the axis of the barrel and extending oppositely therefrom, each tab having an outer surface terminating in a free end spaced away from the barrel, an interference surface sloping from the tab free end downwardly toward the housing mounting surface and inwardly toward the barrel, and an interference region bounded by the interference surface. A cooperative raised panel capture plateau lies below the capture tab interference surfaces and extends therebeyond away from the barrel; a panel capture tab interference surface and the panel capture plateau include an acute angle between them.

The spring element has a generally planar central portion defining a passage adapted to pass over the panel capture tabs to permit assembly of the spring element to the component housing adjacent the panel capture plateau, and has a spring locking arm and a spring stabilizing arm extending oppositely away from the spring element central portion.

The spring stabilizing arm and spring locking arm in an unstressed condition of the spring element are both bent out of the plane of the spring element central portion in the same sense. The spring stabilizing arm is bent back through the plane of the spring element central portion to provide a stabilizing arm bearing bend and a stabilizing arm lateral anchor portion distal from the spring element central portion. The spring locking arm is bent back through the plane of the spring element central portion to provide a spring locking arm bearing bend and a spring locking arm anchor portion distal from the spring element central portion. The locking arm further provides a distal locking tip extending further from the housing mounting surface than the spring locking arm bearing bend in unstressed condition of the spring element.

The spring element moves, responsive to a varying force exerted on the spring arm bearing bends toward the housing mounting surface, between an unstressed position in which the spring arms are unstressed; a depressed position in which the spring locking arm locking tip is level with the spring element central portion and engages a panel surface to stress the spring locking arm; and a locking position in which the spring arm bearing bends engage a first panel surface to stress the spring arms, the spring locking arm locking tip extending away from the housing mounting surface further than the spring locking arm bearing bend to engage an apertured panel axially captured between the panel capture tabs and the panel capture plateau.

Paired spaced bosses on opposed borders of the mounting surface extending outwardly of the component housing; the bosses of a pair are spaced apart to laterally capture a spring arm distal anchor portion between them. Preferably the spring arm distal anchor portions are of different widths, for assembly of said spring element to said housing in a single orientation only.

In another embodiment, the spring element further provides a spring release arm distal to the spring locking arm locking tip and extending angularly away from the housing, the release arm being compressible toward the housing to release the spring locking arm locking tip from locking engagement with an apertured panel.

DETAILED DESCRIPTION OF THE INVENTION

Figure 1:
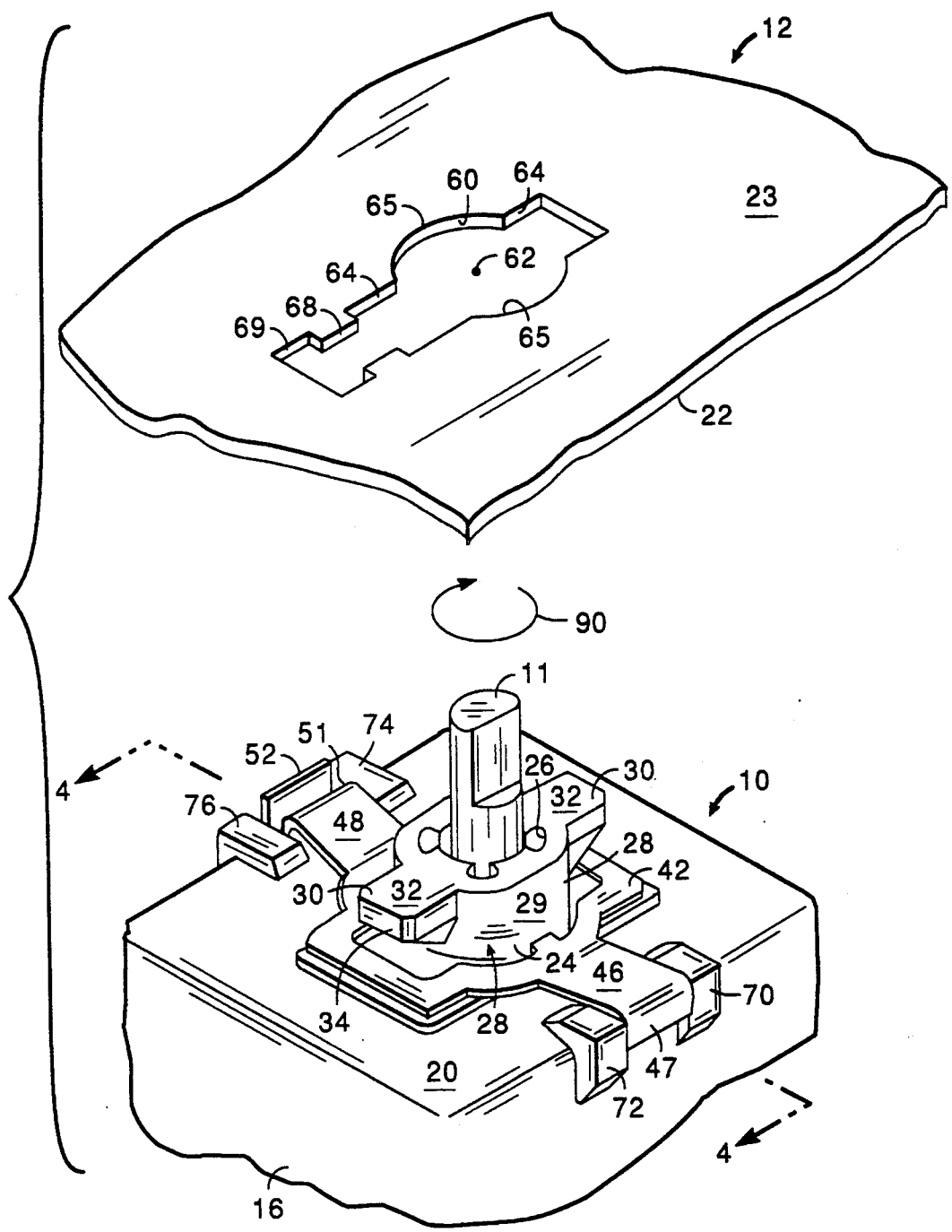
FIG. 1 is a perspective view of the component housing with apertured panel to which it is to be mounted, according to the invention.
Figure 2:
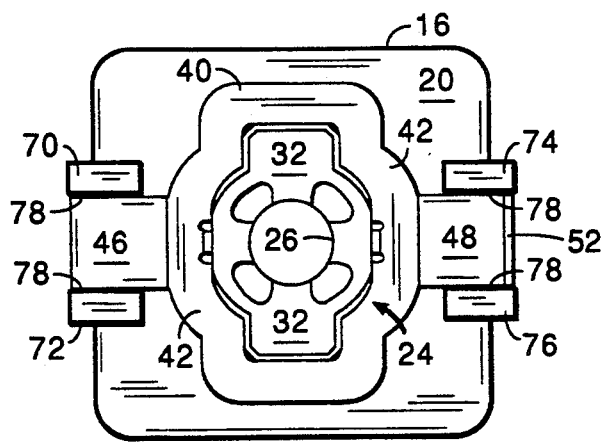
FIG. 2 is a plan view of the component housing according to the invention, with switch actuator shaft removed.

Referring now to the drawing, and in particular to FIG. 1, according to the invention, an electromechanical component 10 provides mounting structure such that the component can be assembled by a twist-in action to an apertured panel 12. Component 10 as shown in the drawing is operated by means of a control shaft 11, but the invention is not limited to components operated by a control shaft. Component 10 may be a pushbutton switch or a rotary switch, or other electromechanical component. Such a component may be used in a household appliance, for example a dishwasher or a clothes dryer.

Figure 6:
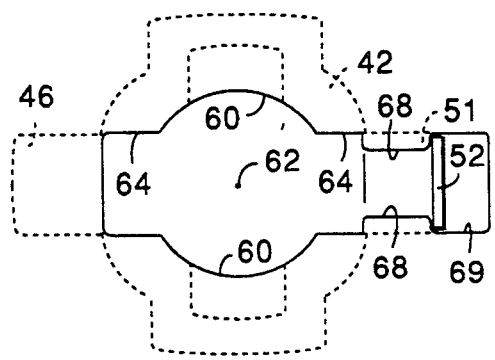
FIG. 6 shows the relation between panel aperture and the spring element of the twist-in mounting structure according to the invention in assembled condition.
Figure 5:
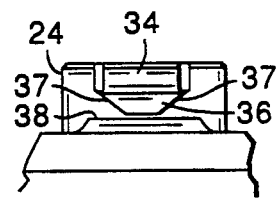
FIG. 5 is a detail view of a portion of the twist-in mounting structure according to the invention.
Figure 4:
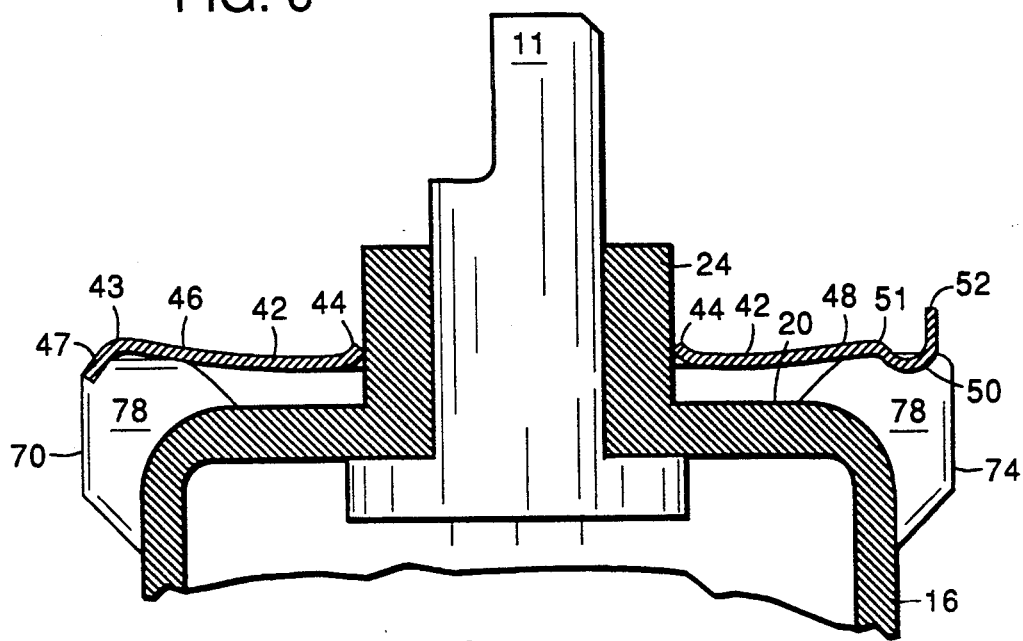
FIG. 4 is a cross sectional view taken on line 4—4 of FIG. 1.
Figure 11:
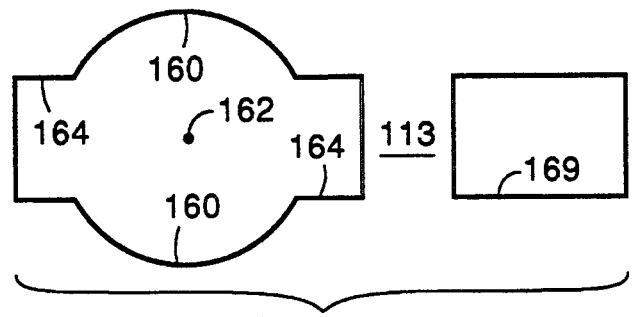
FIG. 11 is similar to FIG. 6 but shows an alternative form of the panel aperture.

The mounting structure of component 10 is adapted for twist-in mounting either to a single aperture in a panel 12 (as seen in FIG. 6) or to two adjacent apertures (as seen in FIG. 11). The aperture of FIG. 6 is defined by a continuous wall joining upper and lower surfaces 23, 22 in panel 12. The continuous wall has arcuate boundary sections 60 circularly symmetric about a center 62, and a pair of wing boundary wall sections 64 defining aperture wing boundary portions. The intersection of circularly symmetric continuous wall sections 60 with upper surface 23 of panel 12 defines interference edges 65.

Wall locking section 69 defines an aperture locking portion, joined by the wall neck portions 68 to one of the aperture wing boundary portions.

Referring now further to FIGS. 2, 3, 4, and 5, as well as to FIG. 1, according to the invention, component 10 provides a housing 16 which may either comprise a case and cover secured together, or a single block. Housing 16, or its cover in the case of a non-integral housing, is molded of thermoplastic material such as 15% glass reinforced polyester. A suitable material is "Valox DR-48" made by General Electric. Housing 16 has an exterior mounting surface 20 which when component 10 is assembled to panel 12 faces the lower surface 22 of panel 12.

Twist-in mounting structure comprises portions integrally molded with mounting surface 20, and additionally comprises a spring element. The molded portion of the twist-in mounting structure comprises a barrel 24 extending outwardly of mounting surface 20 and defining a central aperture 26 for passage of component control shaft 11. In embodiments adapted for mounting electromechanical components not controlled by a control shaft, no central aperture need be provided. Barrel 24 has four surface regions 28 all being portions of a generally cylindrical surface concentric about the center of barrel 24. On two opposite sides of barrel 24 the cylindrical surface portions 28 are joined by flats 29.

The twist-in mounting structure further comprises two panel capture tabs 30 symmetrically located about the axis of barrel 24 and extending in opposite directions. Each panel capture tab 30 extends away from a pair of barrel cylindrical surface regions 28. Each panel capture tab 30 has an outer surface 32 (spaced from mounting surface 20) terminating in a free end 34 spaced away from barrel 24. A generally flat extended interference surface 36 slopes downwardly from free end 34 toward mounting surface 20 and inwardly toward barrel 24. Beveled or chamfered lead-in surfaces are provided on panel capture tabs 30, including particularly surfaces 37 (FIG. 5), increasing the ease of assembly of component 10 to panel 12.

Figure 7:
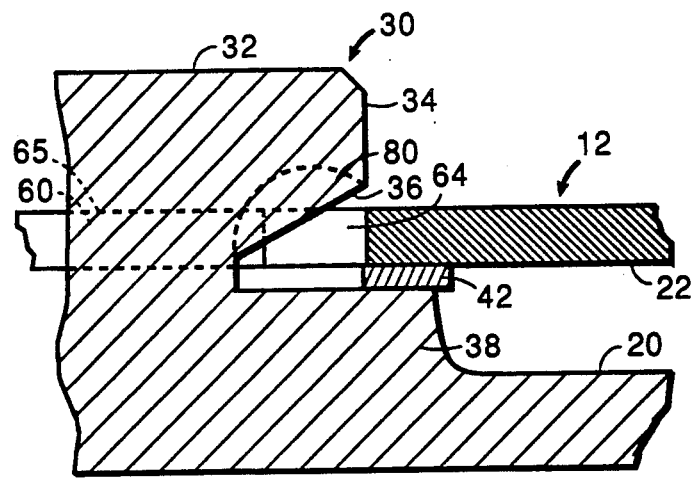
FIG. 7 shows a detail of the component housing and the apertured panel in a first stage of assembly.

Housing mounting surface 20 provides a raised capture plateau 38 below capture tab interference surface 36, cooperating with surface 36 during assembly to panel 12, as will be described. Interference surface 36 meets barrel 24 just above adjacent panel capture plateau 38, barrel and plateau including an acute angle between them (FIG. 7). A small neck or gap is provided between interference surface 36 and plateau 38, as required by molding considerations.

The twist-in mounting structure further comprises a spring element 40, made of spring steel or the like material. Spring element 40 provides a generally flat annular portion 42 dimensioned such that to assemble the mounting structure, element 40 can be moved axially over capture tabs 30 to be placed into the position with respect to component housing shown in FIG. 2. Tangs 44 are provided to engage housing barrel 29 to retain element 40 axially on component housing 16 while component 10 is unassembled to a panel 12 (for example, during shipment or storage).

Element 40 provides two spring arms 46, 48, each being bent away from the plane of annular portion 42 at an angle of about ten degrees. Spring arm 46 is a stabilizing arm, having a distal anchor end 47 bent downwardly back through the plane of annular portion 42, and a bearing bend surface 43. Spring arm 48 is a locking arm, having a distal locking end 49, comprising a bearing bend surface 51, a bight 50 opening away from annular portion 42, and a locking element or tip 52. Bight 50 comprises a spring locking arm distal anchor portion.

Referring again to FIG. 1 and FIG. 4, housing 16 provides opposed pairs of bosses or support ears 70, 72 and 74, 76, extending away from mounting surface 20 and beyond the sides of housing 16. Ears 70, 72, 74 and 76 each provide an interior support surface 78. In preferred embodiments, spring arms 46 and 48 are of different widths. The pairs of bosses or support ears receive at least the distal anchor portions of spring arms 46 and 48 between their opposed interior support surfaces 78, and in a preferred embodiment the spacing of the bosses of each pair is dimensioned with respect to spring arms 46 and 48 such that spring element 40 can be assembled to housing 16 in only a single orientation. Bosses 70, 72, 74 and 76 prevent spring element 40 from rotating with respect to component housing 16.

In the unstressed state (that is, when component 10 is not assembled to a panel 12) stabilizing arm anchor end 47 is laterally captured between ears 70 and 72, and bight 50 of locking arm 42 is laterally captured between ears 74 and 76. Although spring element 40 in the unassembled condition of FIG. 4 may be free to tip slightly with respect to housing mounting surface 20, one or the other of portions 47 and 50 always remains laterally captured between the support surfaces 78 of the associated ears and thus maintains spring element 40 in its proper rotational orientation with respect to surface 20. Additionally, the upper surfaces of ears 70–76, which are level with the top surface of spring element annular portion 42 when supported on plateaus 38, assist in stabilizing housing 16 against panel 12 in assembled condition.

Figure 8:
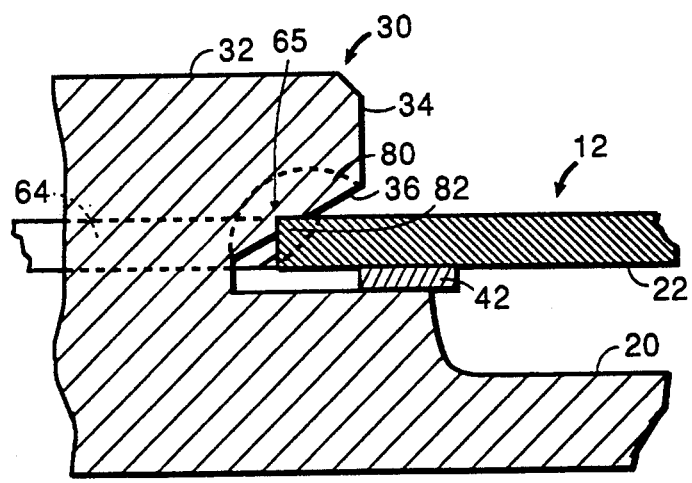
FIG. 8 shows the elements of FIG. 7 in a later stage of assembly, when the panel is relatively harder than the component housing.

Panel capture tab 30 provides an interference region 80 bounded by sloped interference surface 36 (FIG. 7); panel 12 provides a panel interference region 82 adjacent interference edge 65 of the curved portions of panel aperture 14 (FIG. 8).

In assembling component 10 to the aperture of FIG. 6 in panel 12, component housing 16 and panel aperture are initially aligned as seen in FIG. 1, i.e. with panel capture tabs 30 aligned with the wing boundary portions of the panel aperture. The assembler pushes component 10 and panel 12 together, such that panel capture tabs 30 pass through aperture wing boundary portions defined by wall sections 64. The relationship of a panel capture tab 30 and the aperture portions of panel 12 before rotation of component 10 is shown in FIG. 7.

When tabs 30 are aligned with wing boundary wall sections 64 and the assembler pushes component 10 and panel 12 together as described, spring locking arm locking tip 52 and spring stabilizing arm anchor end 47 both bear against lower surface 22 of panel 12, biasing component 10 and panel 12 apart. Force must be exerted to the point that panel lower surface 22 contacts the upper surface of spring element annular portion 42, supported against plateaus 38 (FIG. 7). Spring arms 46 and 48 are depressed toward housing mounting surface 20. This is the depressed position of the spring arms, in which the spring arms are stressed to the greatest extent.

Initially maintaining the necessary force to keep panel lower surface 22 in contact with spring element 40, the assembler twists housing 16 with respect to panel 12 in the sense shown by arrow 90 in FIG. 1. Barrel cylindrical surfaces 28 rotate within aperture arcuate boundary wall sections 60, up to the point that spring element locking tip 52 underlies aperture locking portion defined by wall locking section 69 (FIG. 6). During rotation, spring stabilizing arm bearing bend surface 53 and spring locking arm tip 52 bear against lower surface 22 of panel 12, limiting tilt of component 16 with respect to panel 12. The engagement of stabilizing arm anchor end 47 with panel lower surface 22 maintains the bias of locking arm tip 52 toward panel 12, to ensure that tip 52 will snap through the panel aperture locking portion defined by wall locking section 69.

Figure 9:
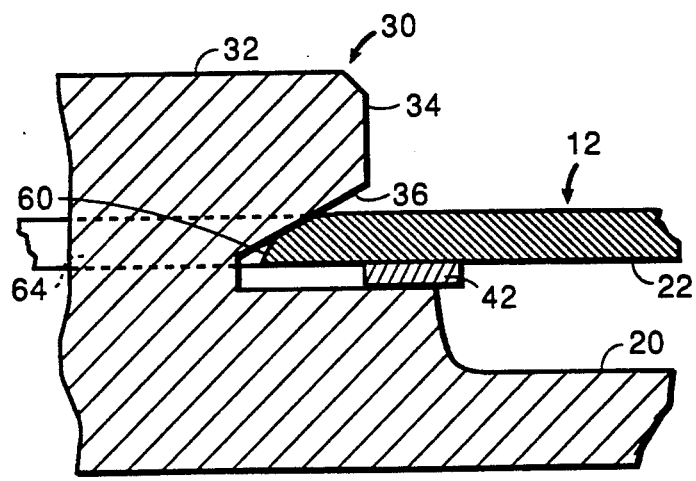
FIG. 9 shows the elements of FIG. 7 in a later stage of assembly, when the panel is relatively less hard than the component housing.

During this rotation, tab interference regions 80 and panel interference regions 82 are jammed together. If the panel is made of material relatively harder or of greater compressive strength than the component housing, for example of metal, the interfering edges 65 of the panel aperture will cut into tab 30, deforming it as shown in FIG. 8. Depending on the thickness of the panel, a great or lesser amount of material may be removed from tab interference region 36. If the panel is made of material relatively less hard or of less compressive strength than panel 12, for example of polypropelene, the interfering edge portions of panel 12 will be deformed as shown in FIG. 9. In either case a tight fit is achieved.

At the completion of the rotation of component 10 through 90 degrees with respect to panel 12, the locking tip 52 springs outwardly through panel locking aperture portion defined by wall locking section 69, into the locking position. An audible click or snap is emitted, providing confirmation to the assembler that the component has been correctly and completely assembled to the panel.

As has been described, spring element 40 can be assembled to component housing 16 in a defined orientation only. As will be seen from the drawings, spring element 40 can be assembled to apertured panel 12 in a defined orientation only. Therefore the electromechanical component in housing 16 is assembled to panel 12 in a defined single orientation. This is desirable when for example panel 12 bears indicia or other graphics with which control shaft 11 is to be aligned.

At the completion of the twist-in assembly, after the spring locking arm tip 52 springs outwardly through the aperture locking portion, panel 12 is captured snugly between capture tabs 30 and spring element 40, supported against plateaus 38. Therefore there is no axial play or slack between component 10 and panel 12. In addition, spring locking arm 48 remains stressed in the locking position by the pressure of panel lower surface 22 downwardly on stabilizing arm anchor end 47 and on locking arm bearing bend 51, which contributes to the firm retention of component 10 to panel 12.

Panel capture plateaus 38 support spring element 40 which supports panel 12 during assembly of the component, preventing "dishing" of the panel. Accidental dislodging of the component by impact on shaft 11 is also prevented, since axial impact alone will not disengage the panel capture tabs (unless the impact force is great enough to break the switch housing).

However, component 10 is removable in either of two ways. First, from upper surface 23 of panel 12, a tool (such as a screwdriver) may be pushed through panel aperture neck portion defined by wall sections 68 to bear against spring locking arm 48. When arm 48 is depressed far enough to release locking tip 52 from the aperture locking portion, component 10 may be rotated 90 degrees and released from panel 12.

Alternatively, from lower surface 22 of panel 12, a tool (such as a screwdriver) may be inserted through the open portion of the aperture locking portion over locking tip 52, and by a prying action tip 52 may be disengaged from panel 12. Component 10 may then be rotated 90 degrees and released from panel 12. In either case, component 10 may be remounted.

Referring now to FIG. 11, the twist-in mounting of the invention may also be assembled to a panel aperture having two disjoint portions. A continuous wall joining upper and lower panel surfaces has arcuate boundary portions 160 circularly symmetric about a center 162, and a pair of aperture wing boundary portions defined by walls 164. The panel provides an adjacent locking aperture defined by wall portion 169, but the two apertures are discontinuous, being spaced apart by panel portion 113. The process of twist-in assembly of component 10 to panel 12 does not differ from what has been described in connection with the aperture shown in FIG. 6.

Figure 10:
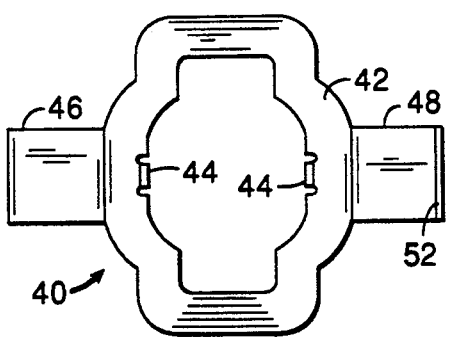
FIG. 10 is a plan view of the spring element of the twist-in mounting structure according to the invention.
Figure 3:
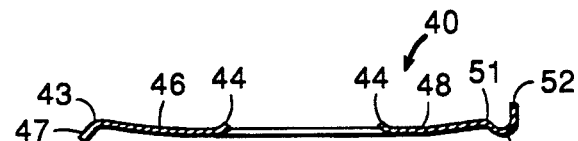
FIG. 3 is a cross section through the spring element of the twist-in mounting structure according to the invention.
Figure 12:
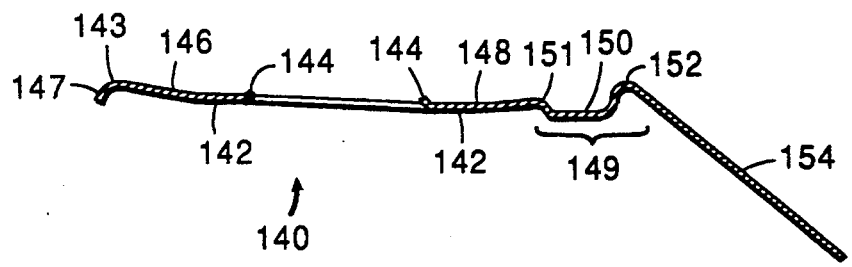
FIG. 12 is shows an alternative form of the element shown in FIG. 3.

In an alternative embodiment, component 10 may be released from panel 12 without the use of a tool. Referring to FIG. 12, an alternative form of spring element is seen. Modified spring element 140 is generally similar to element 40 shown in FIG. 10 and FIG. 3, being dimensioned such that element 140 can be moved axially over capture tabs 30, having tangs 144, and having spring arms 146 and 148, each bent away from the plane of annular portion 142 at an angle of about ten degrees. Spring arm 146 is a stabilizing arm, having a distal anchor end 147 bent downwardly back through the plane of annular portion 142, and bearing bend surface 143. Spring arm 148 is a locking arm, having a distal locking end 149 comprising a bearing bend surface 152, a bight 150 opening away from annular portion 142, and a locking element or tip 152. An unlocking or release arm 154 extends from locking tip 152. The dimensions of element 140 and housing 16 are such that in assembled condition, unlocking arm 154 extends beyond housing 16 and downwardly from surface 20.

The electromechanical component 10 is assembled to panel 12 as has been described. Thereafter, from below panel 12, one can grasp component 10 and unlocking arm 154 in one hand, compressing release arm 154 with respect to component 10 to release locking tip 52 from the aperture locking portion. Component 10 can then be rotated to align panel capture tabs 30 with aperture wing portions in order to remove component 10 from panel 12.

What is claimed is:

1. For assembly to an apertured panel, an electromechanical component having
   a housing having a mounting surface which when said component is assembled to a panel is adjacent a first panel surface, said component housing providing twist-in mounting structure comprising
   a barrel extending outwardly of said housing mounting surface, and
   panel capture tabs integrally formed with said housing and extending oppositely away from the axis of said barrel, each said panel capture tab terminating in a free end spaced away from said barrel,
   each said panel capture tab having
      a panel interference surface sloping from said capture tab free end downwardly toward said housing mounting surface and inwardly toward said barrel, and
      an interference region bounded by said interference surface,
   said twist-in mounting structure further comprising
      a cooperative raised panel capture plateau below said panel capture tab interference surfaces, a said panel capture tab interference surface and said panel capture plateau including an acute angle between them, and
      a spring locking arm extending away from said mounting structure barrel and sprung out of the plane of said housing mounting surface, and having a distal locking element,
   said housing mounting surface providing receiving structure for laterally capturing said spring locking arm,
   said spring locking arm responding to a varying force to move between
      an unstressed position in which said spring locking arm is unstressed,
      a depressed position in which said distal locking element is depressed within said housing mounting surface receiving structure, and
      a locking position in which said spring arm distal locking element extends through a panel aperture to fix said component rotationally with respect to a panel axially captured between said panel capture tabs and said panel capture plateau.

2. For assembly to a single aperture in a panel, an electromechanical component having
   a housing made of polymeric material and having a mounting surface which when said component is assembled to a panel is adjacent a first panel surface, said component housing providing twist-in mounting structure,
   said twist-in mounting structure comprising
      portions integrally molded with the component housing, and
      a spring element,
   said integrally molded structure portions comprising
      a barrel extending outwardly of said housing mounting surface, and panel capture tabs symmetric about the axis of said barrel and extending oppositely therefrom,
   each said tab having
      an outer surface terminating in a free end spaced away from said barrel,
      an interference surface sloping from said tab free end downwardly toward said housing mounting surface and inwardly toward said barrel, and
      an interference region bounded by said interference surface,
   said integrally molded structure portions further comprising a cooperative raised panel capture plateau below said capture tab interference surfaces and extending therebeyond away from said barrel, a said panel capture tab interference surface and said panel capture plateau include an acute angle between them, said spring element having a generally planar central portion defining a passage adapted to pass over said panel capture tabs to permit assembly of said spring element to said component housing adjacent said panel capture plateau, and a spring locking arm and a spring stabilizing arm extending oppositely away from said spring element central portion, said spring stabilizing arm and spring locking arm in an unstressed condition of said spring element being both bent out of the plane of said spring element central portion in the same sense, said spring stabilizing arm being bent back through the plane of said spring element central portion to provide a stabilizing arm bearing bend and a stabilizing arm lateral anchor portion distal from said spring element central portion, said spring locking arm being bent back through the plane of said spring element central portion to provide a spring locking arm bearing bend and a spring locking arm anchor portion distal from said spring element central portion, said locking arm further providing a distal locking tip extending further from said housing mounting surface than said spring locking arm bearing bend in unstressed condition of said spring element, said spring element moving, responsive to a varying force exerted on said spring arm bearing bends toward said housing mounting surface, between an unstressed position in which said spring arms are unstressed, a depressed position in which said spring locking arm locking tip is level with said spring element central portion and engages a panel surface to stress said spring locking arm, and a locking position in which said spring arm bearing bends engage a first panel surface to stress said spring arms, said spring locking arm locking tip extending away from said housing mounting surface further than said spring locking arm bearing bend to engage an apertured panel axially captured between said panel capture tabs and said panel capture plateau.

3. The component of claim 2, wherein said twist-in mounting structure further comprises paired spaced bosses on opposed borders of said mounting surface, said bosses extending outwardly of said component housing, said bosses of a said pair being spaced apart to laterally capture a said spring arm distal anchor portion between them.

4. The component of claim 3, wherein said spring arm distal anchor portions are of different widths, said bosses of a first said pair being spaced apart to laterally capture said spring stabilizing arm anchor portion between them, said bosses of a second said pair being spaced apart to laterally capture said spring locking arm anchor portion between them, for assembly of said spring element to said housing in a single orientation only.

5. The component of claim 2, wherein said spring element further provides a spring release arm distal to said spring locking arm locking tip and extending angularly away from said housing, said release arm being compressible toward said housing to release said spring locking arm locking tip from locking engagement with an apertured panel.

* * * * *